(12) United States Patent
Matsui et al.

(10) Patent No.: US 8,040,433 B2
(45) Date of Patent: Oct. 18, 2011

(54) VIDEO OUTPUT APPARATUS, CONTROL METHOD THEREOF, AND VIDEO DEVICE

(75) Inventors: Takayuki Matsui, Osaka (JP); Isamu Ishimura, Kyoto (JP)

(73) Assignee: Panasonic Corporation, Osaka (JP)

( * ) Notice: Subject to any disclaimer, the term of this patent is extended or adjusted under 35 U.S.C. 154(b) by 1234 days.

(21) Appl. No.: 11/678,889

(22) Filed: Feb. 26, 2007

(65) Prior Publication Data

US 2007/0206119 A1 Sep. 6, 2007

(30) Foreign Application Priority Data

Mar. 1, 2006 (JP) ................................ 2006/055541
Nov. 29, 2006 (JP) ................................ 2006/322446

(51) Int. Cl.
| | |
|---|---|
| H04N 7/01 | (2006.01) |
| H04N 11/06 | (2006.01) |
| H04N 5/14 | (2006.01) |
| H04N 5/268 | (2006.01) |
| H04N 9/64 | (2006.01) |

(52) U.S. Cl. ........ 348/441; 348/488; 348/671; 348/705; 348/708

(58) Field of Classification Search ........................ None
See application file for complete search history.

(56) References Cited

U.S. PATENT DOCUMENTS

| | | | |
|---|---|---|---|
| 6,466,274 B1 * | 10/2002 | White | ........................... 348/649 |
| 6,999,131 B2 | 2/2006 | Kishimoto et al. | |
| 7,126,614 B2 | 10/2006 | Leyvi | |

FOREIGN PATENT DOCUMENTS

| | | | |
|---|---|---|---|
| JP | 1995-134577 | * | 5/1995 |
| JP | 2000-333088 | | 11/2000 |

OTHER PUBLICATIONS

English Language Abstract of JP 2000-333088.

* cited by examiner

*Primary Examiner* — Brian Yenke
*Assistant Examiner* — Michael Teitelbaum
(74) *Attorney, Agent, or Firm* — Greenblum & Bernstein, P.L.C.

(57) ABSTRACT

A video output apparatus includes a video output unit which outputs a video signal while switching the format of the video signal between a first format and a second format for expressing color differently. The video output apparatus also includes a mute signal generation unit which generates, as a muting video signal, a specialized video signal expressing a color in which the difference between the color displayed when the specialized video signal is interpreted in its own format and the color displayed when the specialized video signal is interpreted in a different format is a minimum. The video output apparatus further includes a selection unit, which selects one of the video signal outputted by said video output unit and the mute signal generated by said mute signal generation unit and outputs the selected signal, and a control unit, which causes the selection unit to select the mute signal in a period including the switch performed by the video output unit.

8 Claims, 17 Drawing Sheets

FIG. 5

| | Black | White |
|---|---|---|
| RGB (0–255) | R, G, B=0, 0, 0 | R, G, B=255, 255, 255 |
| YCbCr (16–240) | Y, Cb, Cr=16, 128, 128 | Y, Cb, Cr=235, 128, 128 |

FIG. 6

| Before switch | | After switch | | | | |
|---|---|---|---|---|---|---|
| | | YCbCr | | RGB | | |
| | | 4:4:4 | 4:2:2 | 8bit | 12bit | |
| YCbCr | 4:4:4 | | ○ | × | × | |
| | 4:2:2 | ○ | | × | × | |
| RGB | 8bit | × | × | | × | |
| | 12bit | × | × | × | | |

(○: Color scrambling does not occur.
×: Color scrambling occurs.)

FIG. 9

| Muting Video Signal | Interpreted as RGB | Interpreted as YCbCr |
|---|---|---|
| R, G, B=16, 16, 16 | Almost black | Dark green |
| Y, Cb, Cr=16, 128, 128 | Deep purple | Black |

FIG. 10

| Muting Video Signal | 8-bit Components | 10-bit Components | 12-bit Components | 16-bit Components | Interpreted as RGB | Interpreted as YCbCr |
|---|---|---|---|---|---|---|
| R, G, B=16, 16, 16 | | R, G, B=61, 64, 64 | R, G, B=256, 256, 256 | R, G, B=4096, 4096, 4096 | Almost black | Dark green |
| Y, Cb, Cr=16, 128, 128 | Y, Cb, Cr= 64, 512, 512 | Y, Cb, Cr= 256, 2048, 2048 | Y, Cb, Cr= 4096, 32768, 32768 | Deep purple | Black |

FIG. 14

| Muting Video Signal | | | | Interpreted as RGB | Interpreted as YCbCr |
|---|---|---|---|---|---|
| 8-bit Components | 10-bit Components | 12-bit Components | 16-bit Components | | |
| R, G, B= 16+16, 16+16, 16+16 | R, G, B=64+64, 64+64, 64+64 | R, G, B=256+256, 256+256, 256+256 | R, G, B=4096+ 4096, 4096±4096, 4096±4096 | Permissible range near black | Permissible range near dark green |
| Y, Cb, Cr=16+16, 128 ±16, 128±16 | Y, Cb, Cr= 64,+64, 512± 64, 512±64 | Y, Cb, Cr=256+ 256, 2048±256, 2048±256 | Y, Cb, Cr= 4096+4096, 32768± 4096, 32768±4096 | Permissible range near deep purple | Permissible range near black |

VIDEO OUTPUT APPARATUS, CONTROL METHOD THEREOF, AND VIDEO DEVICE

BACKGROUND OF THE INVENTION (1) Field of the Invention

The present invention relates to a video output apparatus which sends a video signal to a receiving apparatus such as a television receiver, and particularly relates to a video output apparatus in which the color format of the video signal can be switched.

(2) Description of the Related Art

In recent years, devices that handle digital video signals have become common due to the spread of Digital Versatile Disks (DVDs) and digital television broadcasting.

The High-Definition Multimedia Interface (HDMI) standard can be given as an example of an interface which connects a sending device that sends a video signal (i.e. a DVD player) with a receiving device that receives the video signal (i.e. a television). HDMI is an interface for transmitting baseband digital video signals to receiving devices, and is being implemented in consumer devices while maintaining backwards compatibility with the Digital Visual Interface (DVI) standard widely used in personal computers (PCs). A single HDMI cable connects the sending device with the receiving device, and transmits baseband video and audio data. The supported color format of this transmittable video signal is not limited only to the RGB signals used in PCs; HDMI also supports luminance and chroma signals (hereafter referred to as "YCbCr" signals), which are generally used in television receiving devices.

FIG. 1 is a block diagram showing a simplified configuration of a system connected via HDMI. This system includes a sending device 10 and a receiving device 20. The sending device 10 and the receiving device 20 are connected via an HDMI cable. An HDMI sending unit 700 included in the sending device 10 sends video data and audio data to the receiving device 20 via the HDMI cable. Identification information packets are multiplexed with the video signal. The identification information packets indicate whether the video data is an RGB signal or a YCbCr signal.

FIG. 2 is a diagram showing the position, within the video signal, of the identification information packets multiplexed with the video signal. In FIG. 2, a progressive image with a resolution of 720×480 pixels is shown as an example. Furthermore, a single identification information packet is multiplexed in each frame during the vertical blanking interval (VBI) of the video signal.

The sending device 10 can, via remote-control operations or the like performed by a user, switch the color format of the video signal being sent to a desired color format, in accordance with the abilities of the receiving device 20 or based on the user's preferences.

FIG. 3 is a block diagram showing a configuration of the HDMI sending unit 700, which is capable of switching the color format of the video signal. As shown in FIG. 3, the HDMI sending unit 700 includes a video input unit 701, a color conversion unit 702, an identification information packet issuing unit 703, and a video output unit 704, and switches the color format via a CPU 710 provided within the sending unit 10.

The video input unit 701 inputs YCbCr or RGB video data.

When conversion has been instructed by the CPU 710, the color conversion unit 702 converts the YCbCr signal to an RGB signal in the case where a YCbCr signal has been obtained from the video input unit 701, or converts an RGB signal to a YCbCr signal in the case where an RGB signal has been obtained from the video input unit 701. However, in the case where conversion has not been instructed by the CPU 710, the video signal obtained from the video input unit 710 is not converted, and is outputted as-is to the video output unit 704.

The identification information packet issuing unit 703 generates identification information packets which indicate whether the video signal is an RGB signal or a YCbCr signal. The receiving device 20 performs color conversion in accordance with the identification information packets in order to display the image.

The video output unit 704 multiplexes the video signal obtained from the color conversion unit 702 with the identification information packets, and transmits the multiplexed signal over the HDMI cable in accordance with the HDMI specification.

FIG. 4 is a diagram showing a control sequence for switching the color format performed in the HDMI sending unit 700. FIG. 4 shows a control sequence executed in the case of switching from a YCbCr signal to an RGB signal. The horizontal axis indicates time. In addition, the top four signals are signals on the sending device 10 side, while the bottom two signals are signals on the receiving device 20 side. In other words, FIG. 4 shows the following items, in order from the top down: commands outputted by the CPU 710 to the HDMI sending unit 700; inputted video data inputted to the color conversion unit 702; video data outputted by the color conversion unit 702; identification information packets issued by the identification information packet issuing unit 703; received video data received by the receiving device 20; and received identification information packets.

Upon detecting a remote control operation for switching the color format, the CPU 710 outputs, to the color conversion unit 702, a switch command indicating that the YCbCr signal is to be switched to an RGB signal (T1), and then outputs, to the identification information packet issuing unit 703, a switch command indicating that the identification information packets indicating a YCbCr signal are to be switched to identification information packets indicating an RGB signal (T2). The difference in timing of the two switch commands spans several frames. The reasons for this difference in timing between the two switch commands are as follows. First, the CPU 710 operates not only the HDMI sending unit 700 but also the sending unit 10 as a whole, and thus the period of the switch command increases in accordance with the processing load required for controlling the entire sending unit 10. Furthermore, the processing power of the CPU 710 is lower than that of PCs or the like.

Due to the timing difference between the two switch commands, a timing difference also arises between the timing at which the video data outputted from the color conversion unit 702 is switched and the timing at which the identification information packets issued from the identification information packet issuing unit 703 are switched. As a result, the timing difference travels through the HDMI cable, and a difference between the timing at which the received video data is switched and the timing at which the received identification information packets are switched (the period "Ta" in FIG. 4) arises in the receiving device 20.

During the period Ta, in which the color format of the received video data and the color format indicated by the received identification information packets differ, the receiving device 20 mistakenly interprets the received video data as being of the color format indicated by the received identification information packets, and displays the video data. The result is color scrambling during the period Ta.

In order to mask visual noise arising when the video format of a television broadcast is switched from progressive to interlaced and vice versa, Japanese Laid-Open Patent Application No. 2000-333088 discloses a technique in which the video is muted for a period starting from before the video format switch and continuing until after the video format switch.

However, there is a problem with the above conventional art in that while it is possible to mask visual noise arising when switching between video formats with different scanning methods, it is not possible to mask the color scrambling that arises when switching between video formats that have different color formats. In the example given in FIG. 4, color scrambling spanning several frames occurs in the video display when switching the color format, and while the scrambled colors occurs only for an instant, it is sufficient to give a user a sense of discomfort and cause the user to worry that the sending device or the receiving device may have malfunctioned.

FIG. 5 is a table contrasting the color data of RGB and YCbCr signals in regards to black and white colors. In FIG. 5, black and white color values are shown for a 24-bit RGB signal and a 24-bit YCbCr signal respectively. In the RGB signal, black is expressed by the values (R, G, B)=(0, 0, 0), while the white is expressed by the values (255, 255, 255). On the other hand, in the YCbCr signal, black is expressed by the values (Y, Cb, Cr)=(16, 128, 128), while white is expressed by the values (235, 128, 128). For example, if an RGB signal expressing black is mistakenly interpreted as a YCbCr signal, or vice versa, an image of differing color and brightness will be displayed. When colors are interpreted incorrectly between color formats which express colors differently, scrambled colors will occur.

FIG. 6 is a table showing combinations in which scrambled colors occur. Each row in FIG. 6 indicates the pre-switch color format, whereas each column indicates the post-switch color format. "4:4:4" for the YCbCr signal indicates that the ratio between the number of pixels for the luminance signal Y, the number of pixels for the chroma signal Cb, and the number of pixels for the chroma signal Cr is 4:4:4. In the same manner, "4:2:2" indicates that this ratio is 4:2:2. "8-bit" for the RGB signal indicates that each RGB component is of 8 bits. In the same manner, "12-bit" indicates that each RGB component is of 12 bits. In FIG. 6, scrambled colors do not occur in color format conversion between RGB signals for which the bit numbers for components differ and in color format conversion between YCbCr signals for which the pixel number ratios differ. On the other hand, there is a problem in that scrambled colors when switching color formats between RGB and YCbCr signals.

It can be thought that scrambled colors will not occur if, for example, there is no difference in the timing between the command issued from the CPU instructing the color format switch and the command issued from the CPU instructing the identification information packet switch. However, even if there is no difference in the timing, the problem of scrambled colors occurring still exists in cases where the receiving device has low processing power, the receiving device cannot synchronize its interpretation of the identification information packets with a change in the color format of the video signal, and other such cases.

Accordingly, an object of the present invention, which has been conceived in light of the abovementioned problems, is to provide a video signal sending device which reduces the occurrence of scrambled colors when switching video signals between different types of color formats, thereby alleviating a sense of discomfort or worries of malfunctions on the part of the user.

SUMMARY OF THE INVENTION

To achieve the above-mentioned object, the video output apparatus according to the present invention includes: a video output unit which outputs a video signal while switching the format of the video signal between a first format and a second format for expressing color differently; a mute signal generation unit which generates, as a muting video signal, a specialized video signal expressing a color in which the difference between the color displayed when the specialized video signal is interpreted in its own format and the color displayed when the specialized video signal is interpreted in a different format is a minimum; and a selection unit which selects one of the video signal outputted by the video output unit and the mute signal generated by the mute signal generation unit, and outputs the selected signal. With such a configuration, in the case where the interpretation of the color format is changed on the receiver side while the specialized video signal for muting is being outputted, the color in which the difference between the color displayed when the specialized video signal is interpreted in its own format and the color displayed when the specialized video signal is interpreted in a different format is minimum is outputted, which makes it possible to reduce color scrambling. Such a configuration has an effect that a sense of discomfort and worries of possible malfunctions on the part of the user can be avoided.

In addition, in the case where the interpretation of the color format is changed on the receiver side while the specialized video signal for muting is being outputted, outputting the color in which the visual difference between the color displayed when the specialized video signal is interpreted in its own format and the color displayed when the specialized video signal is interpreted in a different format is low achieves the same effect.

Here, in the case where said video output unit switches the video signal from the first format to the second format, the mute signal generation unit may generate the specialized video signal of the first format during a period including the format switch; in the case where the video output unit switches the video signal from the second format to the first format, the mute signal generation unit may generate the specialized video signal of the second format during a period including the format switch; and the specialized video signal of the first format and the specialized video signal of the second format may substantially express the same color. With such a configuration, muting is started using a mute image of the same color both in the case of switching from the first format to the second formation and in the case of switching from the second format to the first format, which has the effect of avoiding a sense of discomfort on the part of the user.

Here, the video output unit may switch the video signal from the first format to the second format; the specialized video signal may be generated in the first format; the first format may be expressed by a 24-bit RGB signal having red, blue, and green color components; and the difference between the color displayed when the specialized video signal of the first format is interpreted in the first format and the color displayed when the specialized video signal of the first format is interpreted in the second format may be minimum, the second format being a 24-bit format having a luminance component and two chroma components.

Here, the video output unit may switch the video signal from the second format to the first format; the specialized video signal may be generated in the second format; the second format may be expressed by a 24-bit YCbCr signal having a luminance component and two chroma components; and the color outputted may be a color in which the difference between the color displayed when the specialized video signal of the second format is interpreted in the second format and the color displayed when the specialized video signal of the second format is interpreted in the first format is a minimum, the first format being a 24-bit RGB format having red, green, and blue color components.

Here, the video output apparatus may further include: a generation unit which generates identification information indicating one of the first format and the second format; an output unit which multiplexes the identification information with the video signal outputted from the selection unit, and outputs the multiplexed video signal to the exterior; and a control unit which controls the generation unit to generate the identification information in accordance with the pre- and post-switch formats during a period that includes the format switch.

Moreover, taking into consideration the characteristics of the receiving side that interprets the video signal as being in the RGB format in the case where the identification information packets are not outputted, the video output apparatus may include: a generation unit which generates identification information indicating one of the first format and the second format; an output unit which multiplexes the identification information with the video signal outputted from said selection unit, and outputs the multiplexed video signal to the exterior; and a switch unit which selects whether or not to output the identification information. The selection unit may be controlled so as to output/not output the identification information in accordance with the switch, at a timing that differs from the timing of the format switch performed by the output unit, during the period.

With such a configuration, output of the identification information packets is temporarily stopped during a range including the mute interval. The receiver handles the video signal as being in a default format (generally speaking, RGB) during the period in which the identification information packets are being stopped. Through this, switching the format in which the video signal is interpreted to be in is performed in the receiver at an early point in time, and thus color change in the mute image can be reduced even further.

Moreover, taking into consideration the characteristics of the receiving side that mutes the screen with a black color or the like in the case where the clock, video data, and the like are not outputted to a transmission channel, the video output apparatus may include: a generation unit which generates identification information indicating one of the first format and the second format; an output unit which multiplexes the identification information with the video signal outputted from said selection unit, and outputs the multiplexed video signal to the exterior; and a switch unit which selects whether or not to output the multiplexed video signal. The selection unit may be controlled so as to output/not output the multiplexed video signal in accordance with the switch, at a timing that differs from the timing of the format switch performed by the output unit, during the period.

With such a configuration, output of the specialized video signal is temporarily stopped during a range including the mute interval. During the period in which the video signal is stopped, the receiver displays an image it has generated internally. This image differs depending on the receiver, but in general is an image displayed through the video signal immediately before muting, such as a black image, a blue image (known as a "blue screen"), or the like. Through this, switching the displayed image is performed in the receiver at an early point in time, and thus change in the mute image can be eliminated depending on the receiver. Alternatively, in the same manner as the second embodiment, switching the format in which the video signal is interpreted to be in can be performed in the receiver at an early point in time, and thus color change in the mute image can be reduced even further.

According to the present invention, it is possible to reduce the occurrence of color scrambling when displaying the specialized video signal in the case where the interpretation of the color format is changed on the receiver side during the output of the specialized video signal for muting. Such a configuration has an effect that a sense of discomfort and worries of possible malfunctions on the part of the user can be avoided.

FURTHER INFORMATION ABOUT TECHNICAL BACKGROUND TO THIS APPLICATION

The disclosure of Japanese Patent Application No. 2006-055541 filed on Mar. 1, 2006, and Japanese Patent Application No. 2006-322446 filed on Nov. 29, 2006, including specification, drawings and claims, are incorporated herein by reference in their entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is a table contrasting the color data of RGB and YCbCr signals.

FIG. 6 is a table showing combinations in which color garbling occurs.

FIG. 9 is a diagram showing data approximating "black" in both the RGB and YCbCr formats.

FIG. 10 is a diagram showing data approximating "black" in both the RGB and YCbCr formats.

FIG. 14 shows examples of ranges black is set at when interpreting RGB and YCbCr signals.

DESCRIPTION OF THE PREFERRED EMBODIMENTS

First Embodiment

Hereafter, a video output apparatus embodying the present invention shall be described. The video output apparatus according to the present embodiment can switch the format of an image signal between a first and a second format in which the method of expressing colors differs and output the signal, and outputs a mute signal in the period surrounding the switch. The mute signal is a specialized video signal, which indicates a color in which the difference between the color displayed in the case where a video signal is interpreted as being of the same format as the specialized video signal and the color displayed in the case where the video signal is interpreted as being of a different format that the specialized video signal is minimum. Color scrambling is reduced in this manner.

Figure 7:
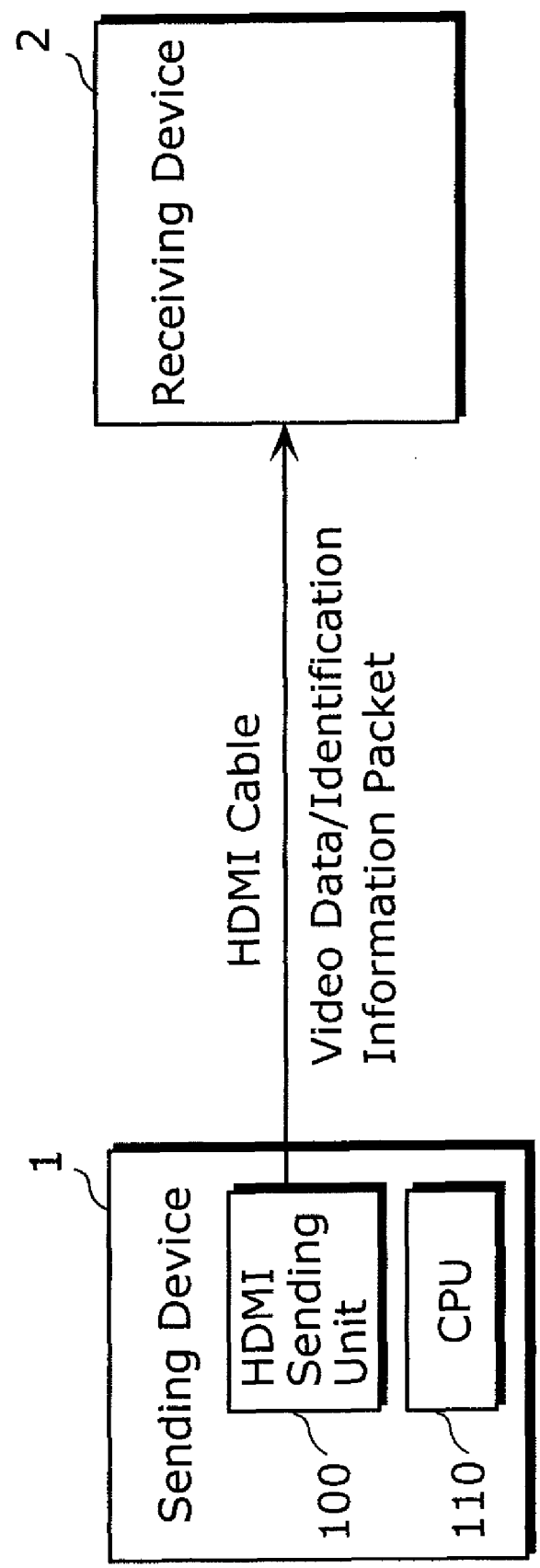
FIG. 7 is a diagram showing an outline of a system that exchanges signals via HDMI according to a first embodiment of the present invention.

FIG. 7 is a diagram showing an outline of a system that exchanges signals via HDMI according to the present embodiment.

This system includes a sending device 1 and a receiving device 2. The sending device 1 is a video output apparatus such as, for example, a DVD player, a DVD recorder, a Set Top Box (STB) that receives digital broadcasts, a digital broadcasting tuner card, or the like. The receiving device 2 is, for example, a television device such as a plasma display TV or a liquid-crystal TV, a video projector, or the like. The sending device 1 and the receiving device 2 are connected via an HDMI cable. The sending device 1 includes an HDMI sending unit 100 and a CPU 110.

Figure 1:
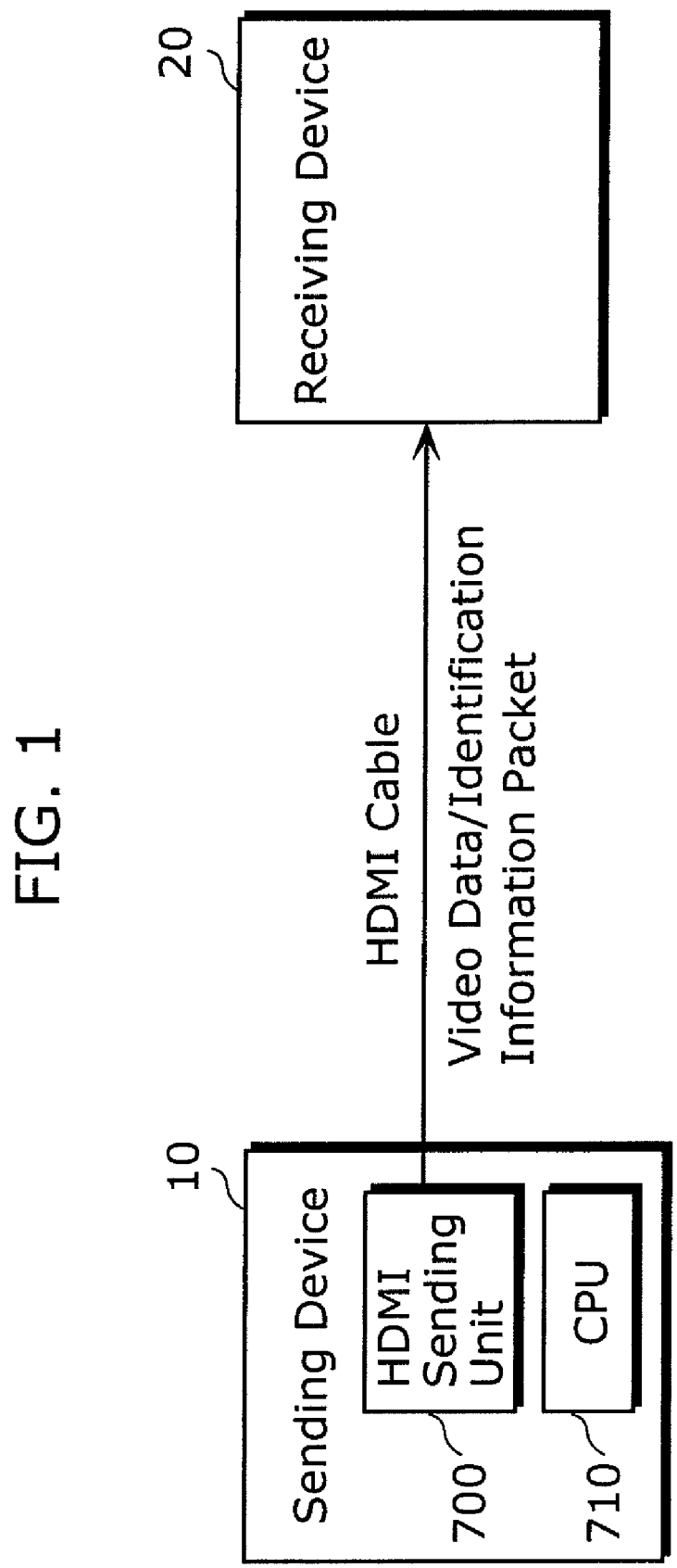
FIG. 1 is a diagram showing an outline of a conventional system that communicates via HDMI.
Figure 2:
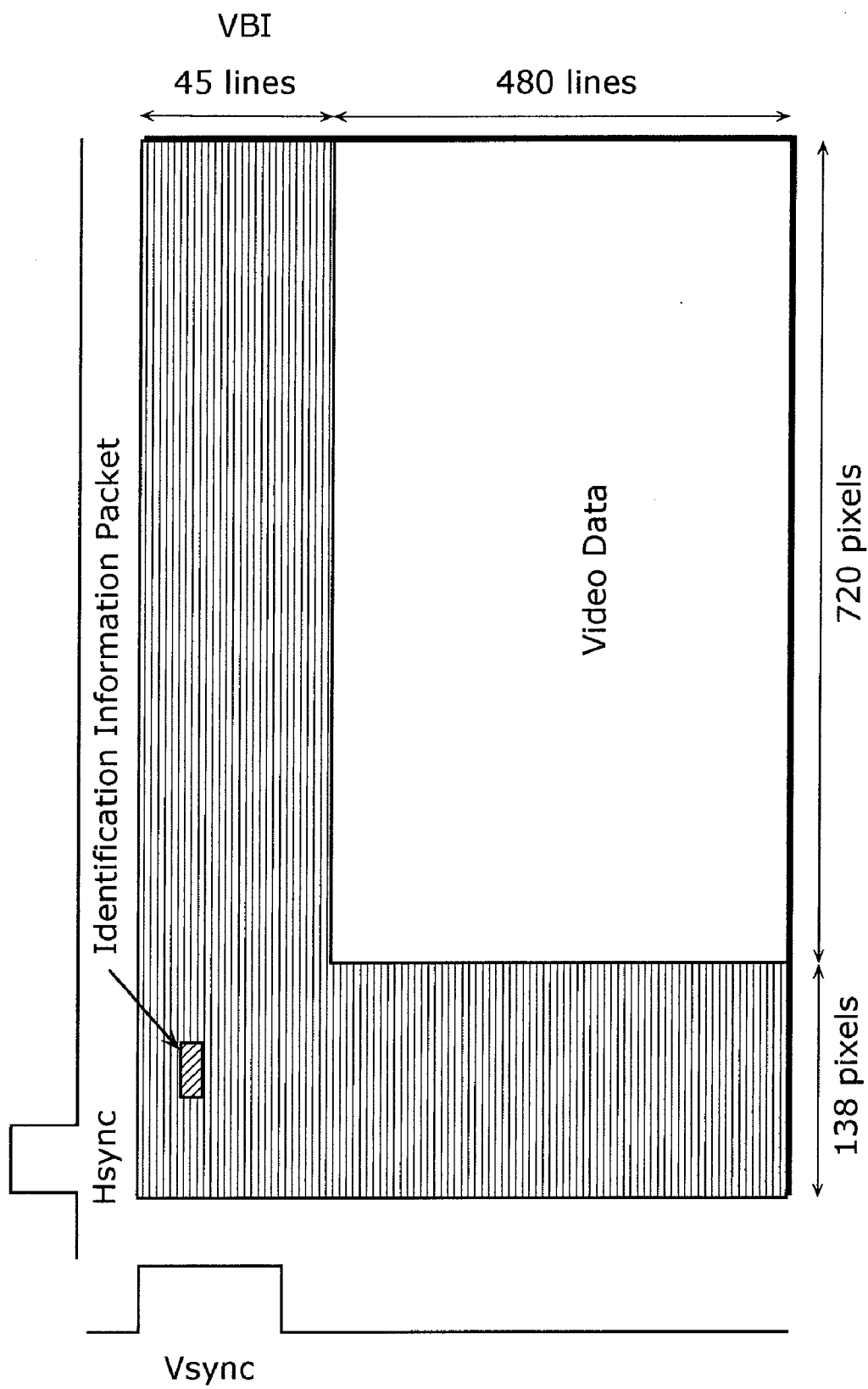
FIG. 2 is a diagram showing a position in which identification information packets are multiplexed, according to the conventional art.
Figure 3:
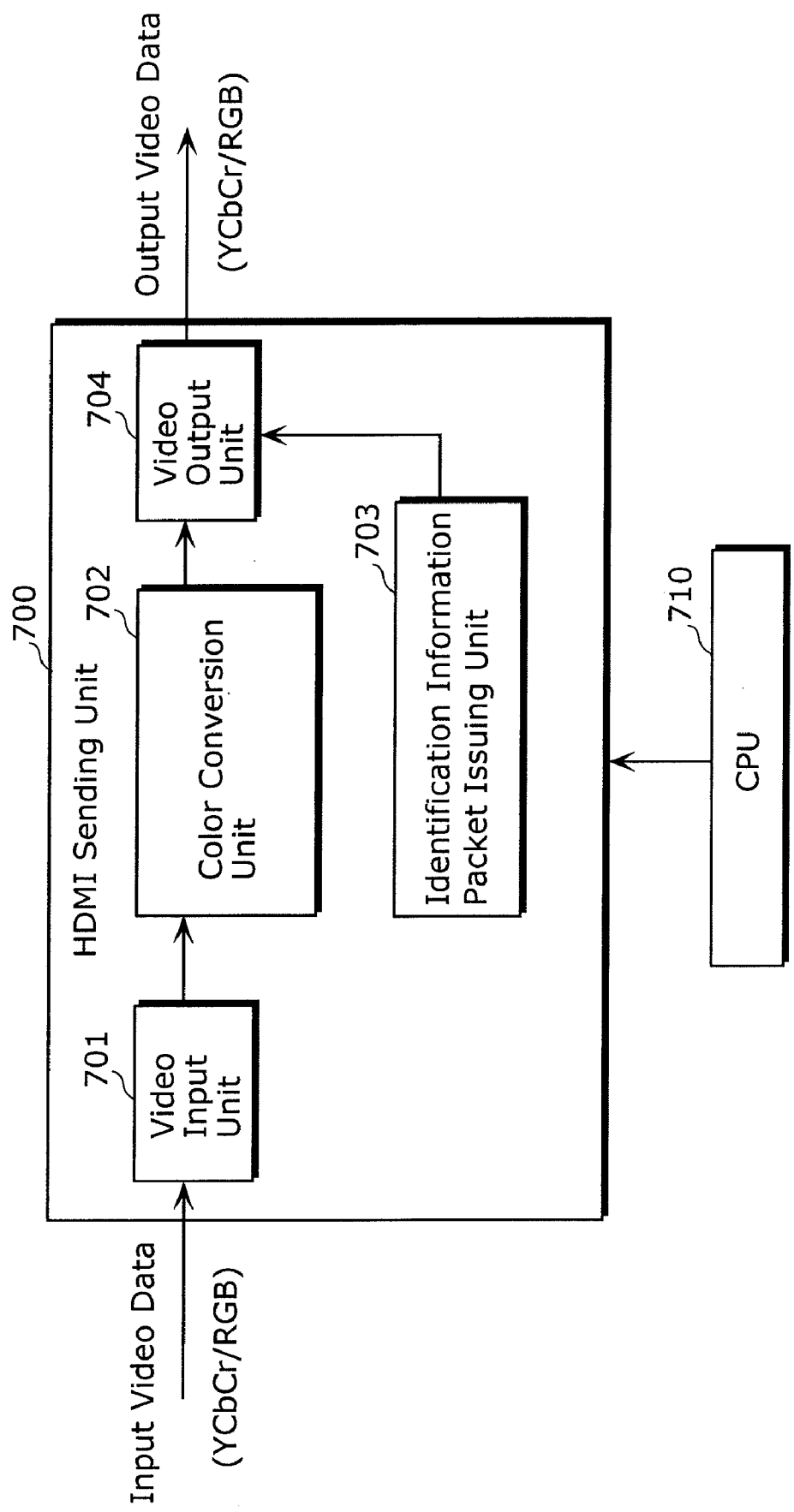
FIG. 3 is a block diagram showing a configuration of an HDMI sending unit according to the conventional art.
Figure 4:
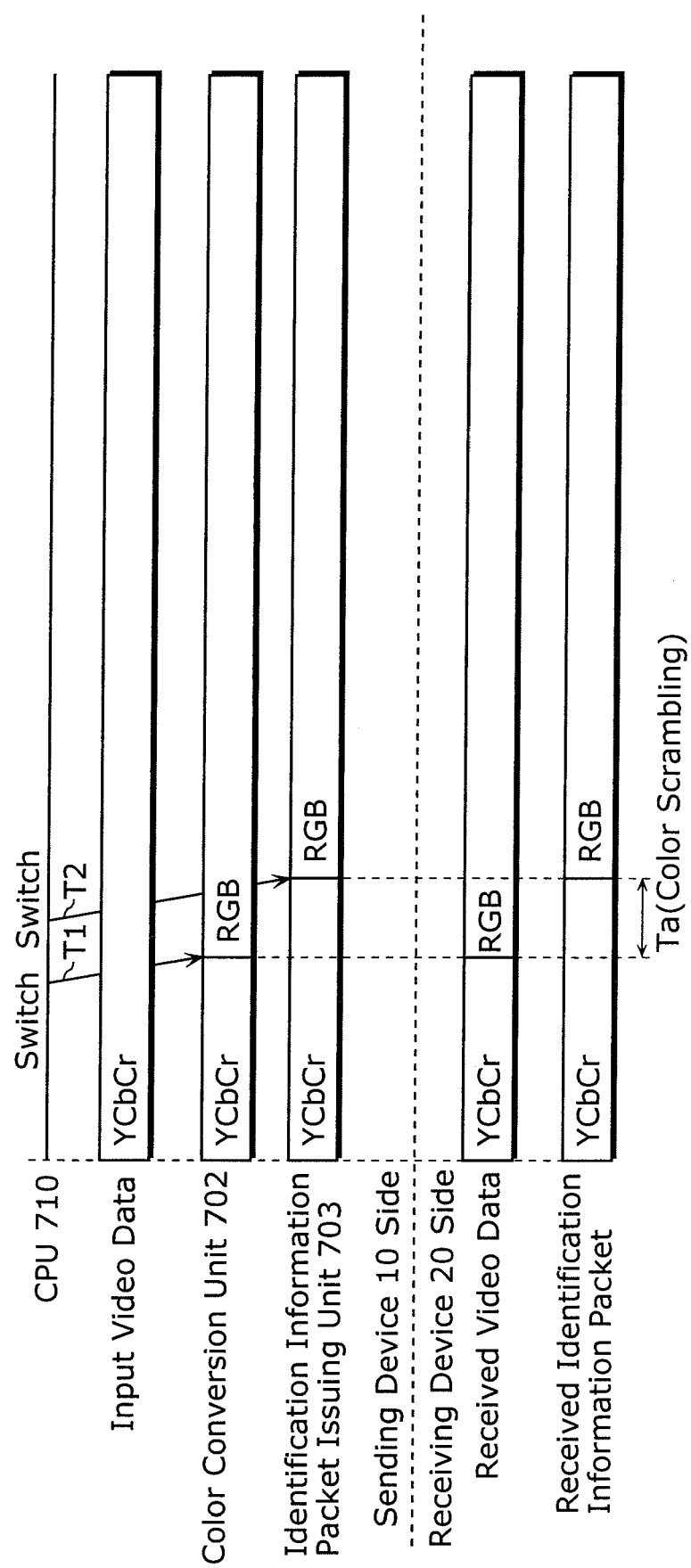
FIG. 4 is a diagram showing a control sequence according to the conventional art.

The HDMI sending unit 100 sends video data and audio data to the receiving device 2 via the HDMI cable. Identification information packets are multiplexed with the video signal. The identification information packets indicate whether the video signal is an RGB signal or a YCbCr signal. The position in which the identification information packets are present within the video signal is the same as indicated in FIG. 2. The HDMI sending unit 100 can switch the format of an image signal between a first and a second format in which the method of expressing colors differs and output the signal, and outputs the abovementioned mute signal in the period including the switch.

The CPU 110 controls the HDMI sending unit 100 and the sending device 1 as a whole. Control of the sending device 1 as a whole includes MPEG decoding when playing back a DVD, MPEG encoding when recording to a DVD, controlling the user interface, and so on.

The receiving device 2 determines the color format of the received data via the identification information packets, interprets the video data in the determined format, and displays the video data.

Figure 8:
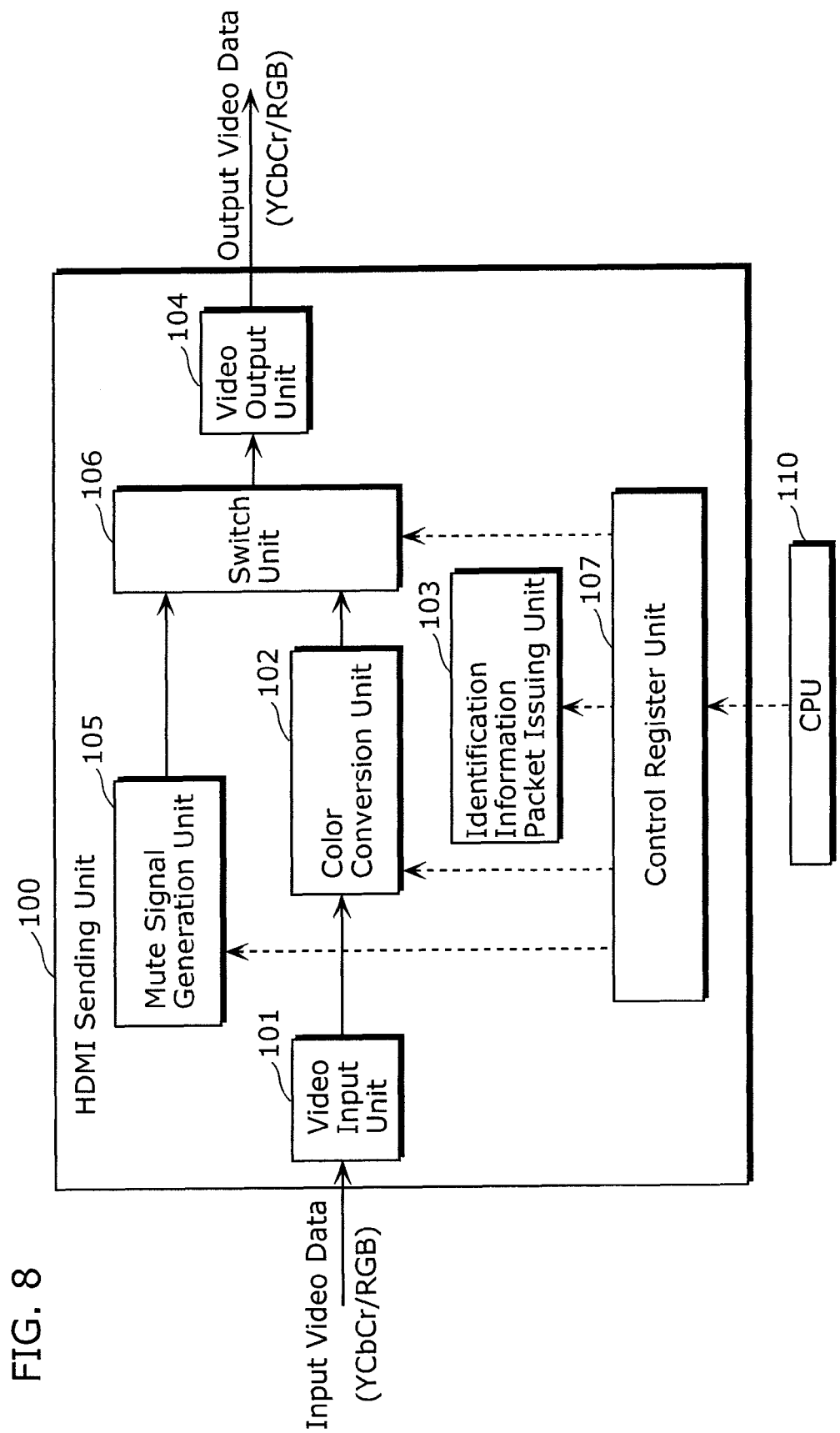
FIG. 8 is a block diagram showing a configuration of an HDMI sending unit.

FIG. 8 is a block diagram showing a configuration of the HDMI sending unit 100. As shown in FIG. 8, the HDMI sending unit 100 includes a video input unit 101, a color conversion unit 102, an identification information packet issuing unit 103, a video output unit 104, a mute signal generation unit 105, a switch unit 106, and a control register unit 107, and switches the color format in accordance with an instruction from the CPU 110. Hereafter, descriptions shall be provided using first through third color formats, which are color formats with different ways of expressing color, as specific examples. The first color format is a 24-bit RGB signal which expresses red, green, and blue (R, G, B) components. The second color format is a 24-bit YCbCr signal which expresses a luminance component (Y) and two chroma components (Cb, Cr), where the ratio (number of pixels for the luminance signal Y: number of pixels for the chroma signal Cb: number of pixels for the chroma signal Cr) is (4:4:4). The third color format is a 24-bit YCbCr signal which expresses a luminance component (Y) and two chroma components (Cb, Cr), where the ratio (number of pixels for the luminance signal Y: number of pixels for the chroma signal Cb: number of pixels for the chroma signal Cr) is (4:2:2). As the same method of expressing colors is used in the second and third color formats, hereafter, references to a "YCbCr signal" refer to one of the second and third color formats.

The video input unit 101 inputs YCbCr or RGB video data.

The color conversion unit 102 converts the YCbCr signal to an RGB signal in the case where a YCbCr signal has been inputted from the video input unit 101, or converts an RGB signal to a YCbCr signal in the case where an RGB signal has been inputted from the video input unit 101, when color conversion has been instructed by the CPU 110. However, in the case where color conversion has not been instructed by the CPU 110, the video signal obtained from the video input unit 110 is not converted, and is outputted as-is to the video output unit 104.

In this manner, the video input unit 101 and the color conversion unit 102 function as a video output means which can switch a video signal between first and second color formats that express color with different methods and output the video signal.

The identification information packet issuing unit 103 generates identification information packets which indicate whether the video signal is an RGB signal or a YCbCr signal. To be more accurate, the identification information packets include information for identifying the first through third color formats. The receiving device 2 interprets the color in accordance with the identification information packets in order to display the image, and displays the image.

The video output unit 104 multiplexes the video signal obtained from the color conversion unit 102 with the identification information packets, and transmits the multiplexed signal over the HDMI cable in accordance with the HDMI specification.

The mute signal generation unit 105 generates a specialized video signal as a muting video signal. The following three types of specialized video signals are generated: a first color format specialized video signal (called an "RGB mute signal" hereafter), and second and third color format specialized video signals (respectively called "YCbCr mute signals" hereafter). For each specialized video signal, a signal of a color in which the difference between the color displayed when the specialized video signal is interpreted in its own format (hereafter, referred to as a "pre-conversion display color") and the color displayed when the specialized video signal is interpreted in a different format (hereafter, referred to as a "post-conversion display color") is generated as the mute video signal.

Explanations shall be given using specific examples of the specialized video signals. It is preferable for the component values of the specialized video signal in the first color format to be, substantially, (R, G, B)=(16, 16, 16). Furthermore, it is preferable for the component values of the specialized video signal in the second and third color formats to be, substantially, (Y, Cb, Cr)=(16, 128, 128).

The reason that these value are preferable in the muting video signals shall be explained hereafter.

FIG. 9 is a diagram describing the colors of the muting video signals. In FIG. 9, the display color when (R, G, B)=(16, 16, 16) is the specialized video signal in the first color format (an RGB mute signal), and is approximately black. True black in an RGB signal is, as shown in FIG. 5, expressed by the values (0, 0, 0); however, when being displayed on the entire screen for muting purposes, the values (16, 16, 16) can be used because the color will simply appear black to the user.

First, a case in which an RGB signal with the values (16, 16, 16) is mistakenly interpreted as a YCbCr signal can be considered. The color displayed for a YCbCr signal with the values (16, 16, 16) is equivalent to the color displayed for an RGB signal with the values (0, 135, 0) (in other words, a dark green color). This is the case in which the difference between the pre-conversion display color and the post-conversion display color is at a minimum. To put it differently, assuming the color displayed in the case where a signal is interpreted as being of the same format as the RGB muting signal is (r1, g1, b1)=(16, 16, 16), the color displayed in the case where the signal is interpreted as being of a different format than the RGB muting signal is (Y, Cb, Cr)=(16, 16, 16), which, when displayed as an RGB signal, is (r2, g2, b2)=(0, 135, 0).

Next, a case in which a YCbCr signal with the values (16, 128, 128) is mistakenly interpreted as an RGB signal can be considered. The colors displayed for an RGB signal with the values (16, 128, 128) is equivalent to the color displayed for a YCbCr signal with the values (95, 147, 72) (in other words, a dark purple color). This, too, is the case in which the difference between the pre-conversion display color and the post-conversion display color is at a minimum. To put it differently, assuming the color displayed in the case where a signal is interpreted as being of the same format as the YCbCr muting signal is (r1, g1, b1)=(16, 128, 128), the color displayed in the case where the signal is interpreted as being of a different format than the YCbCr muting signal is (R, G, B)=(16, 128, 128), which, when displayed as a YCbCr signal, is (r2, g2, b2)=(95, 147, 72).

A permissible range of the pre- and post-conversion display colors shall be explained assuming the above.

This permissible range may be determined in one of the following manners, so that the difference between the pre-conversion display color and the post-conversion display color produces the least amount of discomfort for the user. In other words, the permissible range may be determined (1) so that the difference between the pre- and post-conversion display colors is a minimum; (2) so that the pre- and post-conversion display colors are close to one another; (3) so that the pre-and post-conversion display colors are of the same color system; or (4) so that a range in which discomfort will clearly be felt is not used. The preferable order of use starts with (1) and ends with (4), with (1) being the strictest method, and (4) being the most lenient. The abovementioned RGB=(16, 16, 16) and YCbCr=(16, 128, 128) fulfills the requirements of (1).

Furthermore, (5) it is preferable to display the same color when each specialized video signal in the first, second, and third color formats is interpreted to be in its own color format. This is because doing so allows the initial display color during muting to be the same no matter what color format is switched to another color format. The muting video signal shown in FIG. 9 fulfills the above (5). In FIG. 9, the display color when (R, G, B)=(16, 16, 16) is the specialized video signal in the first color format (an RGB mute signal), and is approximately black. Black in an RGB signal is, as shown in FIG. 5, expressed by the values (0, 0, 0); however, when being displayed on the entire screen for muting purposes, the values (16, 16, 16) can be used because the color will simply appear black to the user.

The color displayed when (Y, Cb, Cr)=(16, 128, 128) is a specialized video signal in the second and third color format (in other words, a YCbCr mute signal), and expresses black, as shown in FIG. 5. In this regard, the abovementioned (5) is fulfilled.

In addition, when an RGB signal with the values (16, 16, 16) is interpreted as a YCbCr signal, the color displayed is a dark green. Therefore, the post-conversion color, which is a dark green, is close in color to the pre-conversion black; the difference between the two is a minimum, and thus it can be said that this situation fulfills the abovementioned (1). Moreover, when a YCbCr signal with the values (16, 128, 128) is interpreted as an RGB signal, the color displayed is a deep purple. Therefore, the post-conversion color, which is a deep purple, is close in color to the pre-conversion black; the difference between the two is a minimum, and thus it can be said that this situation fulfills the abovementioned (1).

FIG. 10 is a diagram describing the color of a muting video signal for 30-bit (10 bits per component), 36-bit (12 bits per component), and 48-bit (16 bits per component) RGB and YCbCr signals. In FIG. 10, the respective 8-bit components shown in FIG. 9 are extended to 10, 12, and 16 bits.

In other words, when decimal values of the 8-bit RGB components with the values (16, 16, 16) are expressed as hexadecimals, the values become (0x10, 0x10, 0x10). By padding the 0s of the bottom two bits of each 8-bit component, the components are extended into 10-bit components, or (R, G, B)=(0x40, 0x40, 0x40). The 10-bit components (R, G, B)=(0x40, 0x40, 0x40) are (64, 64, 64) when taken as decimals.

In the same manner, by padding the 0s of the bottom four bits, the components are extended into 12-bit components. The 12-bit components (R, G, B)=(0x100, 0x100, 0x100) are (256, 256, 256) when taken as decimals.

In the same manner, by padding the 0s of the bottom eight bits, the components are extended into 16-bit components. The 16-bit components (R, G, B)=(0x1000, 0x1000, 0x1000) are (4096, 4096, 4096) when taken as decimals.

When 8-bit YCbCr components with the values (16, 128, 128) are bit-extended in the above manner, the 10-bit extension values are (64, 512, 512), the 12-bit extension values are (256, 2048, 2048), and the 16-bit values are (4096, 32768, 32768).

Note that the component values shown in FIG. 10 do not necessarily have to be the exact values shown; approximate values may be used as long as they are essentially identical to the values shown.

The switch unit 106 selects one of the video signal outputted from the color conversion unit 102 and the muting video signal outputted from the mute signal generation unit 105, and outputs the selected signal to the video output unit 104. Specifically, the switch unit 106 selects the muting video signal during the period including the color format switch performed by the color conversion unit 102, in accordance with a value set in the control register unit 107.

The control register unit 107 receives various control commands from the CPU 110, and outputs control signals to the color conversion unit 102, the identification information packet issuing unit 103, the video output unit 104, and the mute signal generation unit 105.

Figure 11:
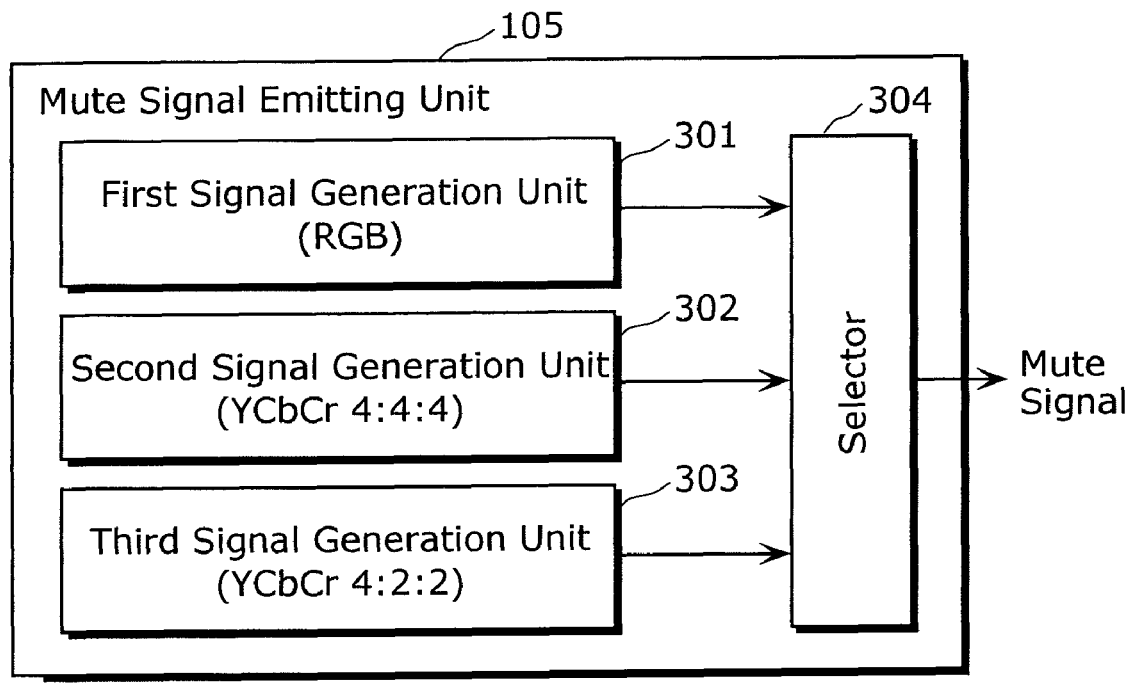
FIG. 11 is a block diagram showing a configuration of a mute signal generation unit.

FIG. 11 is a block diagram showing a configuration of the mute signal generation unit. As can be seen in FIG. 11, the mute signal generation unit 105 includes: a first signal generation unit 301 which generates a specialized video signal of the first color format (in other words, an RGB mute signal); a second signal generation unit 302 which generates a specialized video signal of the second color format (in other words, a 4:4:4 YCbCr mute signal); a third signal generation unit 303 which generates a specialized video signal of the third color format (in other words, a 4:2:2 YCbCr mute signal); and a selector 304.

The first signal generation unit 301, second signal generation unit 302, and third signal generation unit 303 each generate respective mute signals in accordance with parameters set in the control register unit 107.

Figure 12:
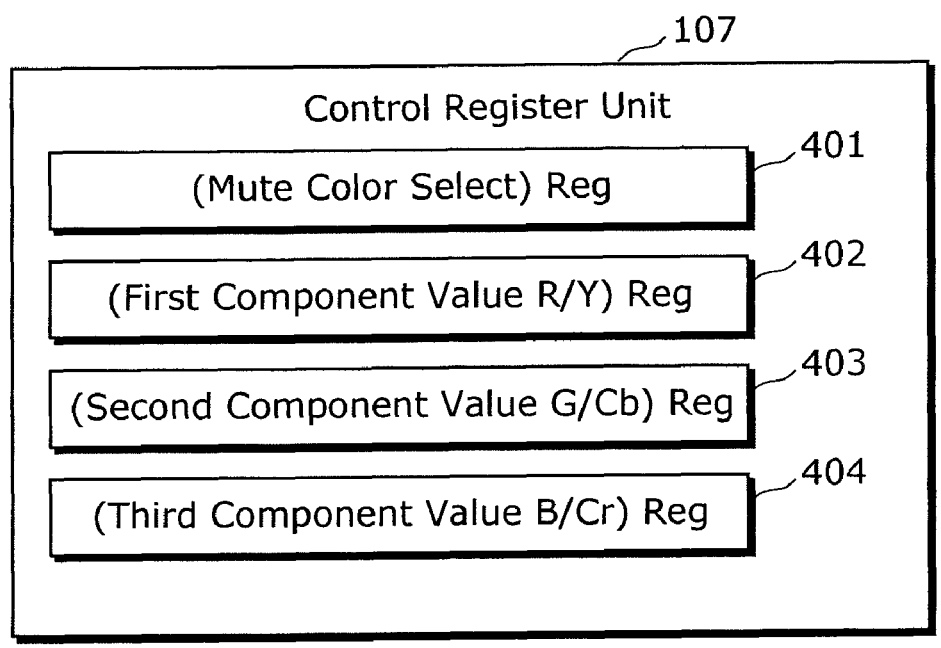
FIG. 12 is a block diagram showing a configuration of a control unit.

FIG. 12 is a block diagram showing an example of the configuration of the control register unit 107. As can be seen in FIG. 12, the control register unit 107 includes registers 401 to 404.

The register 401 holds commands from the CPU 110, and outputs control signals corresponding to the commands to the color conversion unit 102, identification information packet issuing unit 103, video output unit 104, mute signal generation unit 105, and switch unit 106. These commands include: a command for the color conversion unit 102 to switch the color format; a command for the identification information packet issuing unit 103 to switch the color format indicated by the identification information packets; a command for the mute signal generation unit 105 to generate a mute signal; a command controlling the selection of switch unit 106; and the like.

The registers 402 to 404 respectively hold first, second, and third component values of mute signals to be generated by the mute signal generation unit 105. In the case where the mute signal generation unit 105 generates an RGB mute signal, the first, second, and third component values indicate R, G, and B component values, whereas in the case where the mute signal generation unit 105 generates a YCbCr mute signal, the first, second, and third component values indicate Y, Cb, and Cr component values.

Figure 13:
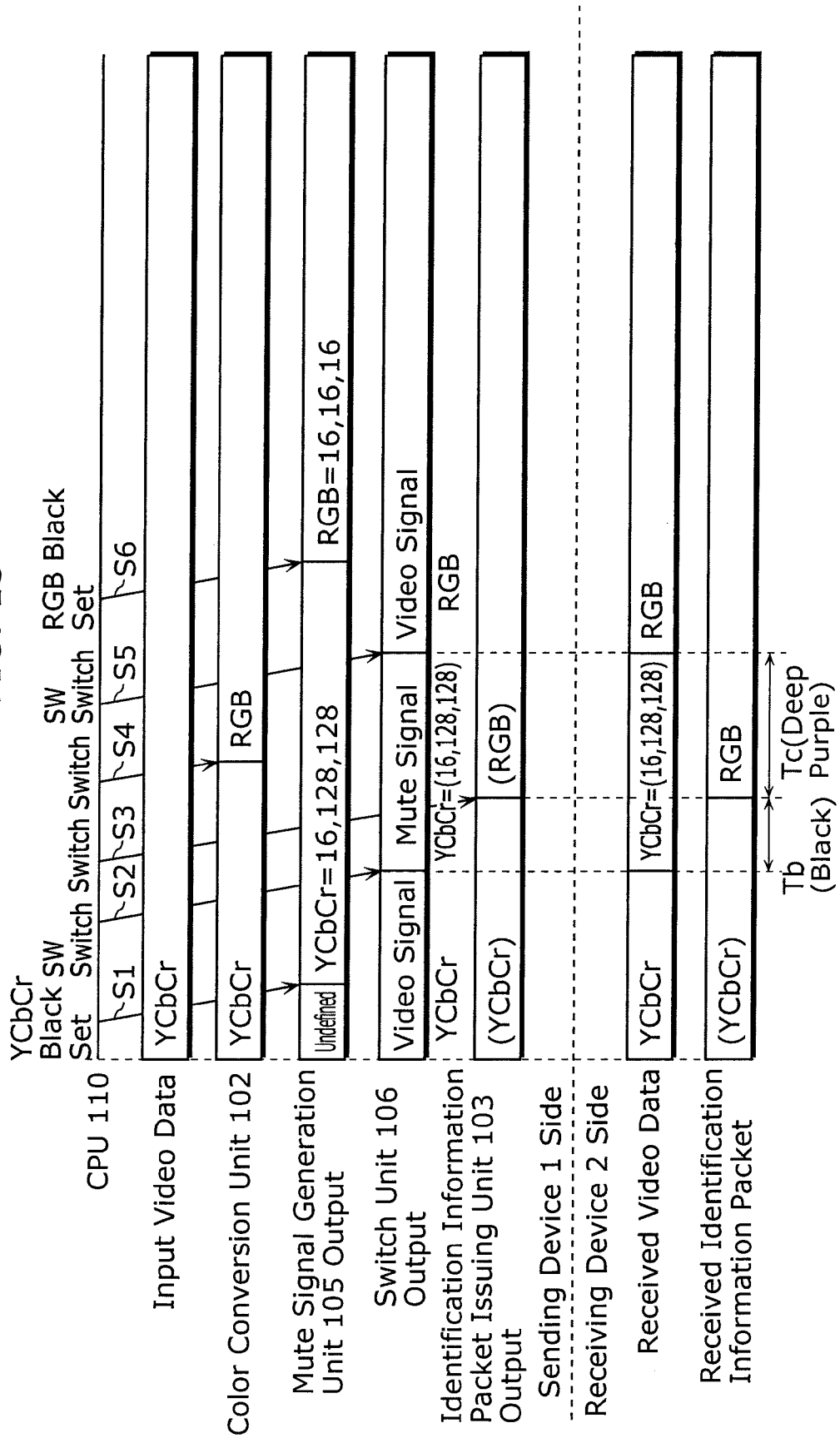
FIG. 13 is a diagram showing a control sequence for switching color formats.

FIG. 13 is a diagram showing a control sequence for switching the color format performed in the HDMI sending unit 100. FIG. 13 shows a control sequence executed in the case of switching from a YCbCr signal to an RGB signal. The horizontal axis indicates time. In addition, the top six signals are signals on the sending device 1 side, while the bottom two signals are signals on the receiving device 2 side. In other words, FIG. 13 shows the following items, in order from the top down: commands outputted by the CPU 110 to the HDMI sending unit 100; inputted video data inputted to the color conversion unit 102; video data outputted by the color conversion unit 102; a mute signal outputted by the mute signal generation unit 105; a video signal/mute signal selected and outputted by the switch unit 106; identification information packets issued by the identification information packet issuing unit 103; received video data received by the receiving device 2; and received identification information packets.

Upon detecting a remote-control operation that indicates the color format is to be switched, the CPU 110 first sets, in the control register unit 107, a command for the mute signal generation unit 105 to generate a YCbCr mute signal (S1). In other words, the CPU 110 sets the first, second, and third component values in the registers 402 to 404 respectively, and furthermore sets, in the register 401, a control command which causes the selector 304 to select either the second signal generation unit 302 or the third signal generation unit 303. Through this, the mute signal generation unit 105 generates a YCbCr mute signal.

Next, the CPU 110 sets, in the register 401, a command so that the switch unit 106 switches from outputting from the color conversion unit 102 to selection of the mute signal from the mute signal generation unit 105 (S2). Through this, a YCbCr mute signal is outputted from the video output unit 104.

Furthermore, the CPU 110 sets, in the register 401, a switch command indicating that the identification information packet issuing unit 103 is to switch from identification information packets indicating a YCbCr signal to identification information packets indicating an RGB signal (S3), and moreover sets, in the register 401, a switch command indicating that the color conversion unit 102 is to convert from a YCbCr signal to an RGB signal (S4). The timing at which the identification information packets are switched in the above S3 and the timing at which the color format is switched in the above S4 may be different; therefore, there is less processing load on the CPU 110 when performing the switch, and thus the processing power of the CPU 110 may be low.

Also, the CPU 110 sets, in the register 401, a command so that the switch unit 106 switches from the mute signal from the mute signal generation unit 105 to selection of the video signal output of the color conversion unit 102 (S5). Accordingly, the video output unit 104 stops outputting a YCbCr mute signal and outputs a color format-converted RGB video signal.

Furthermore, the CPU 110 sets, in the control register unit 107, a command for the mute signal generation unit 105 to generate an RGB mute signal (S6). This is preparation for performing the next color format conversion.

The receiving device 2 receives the YCbCr mute signal in the Tb+Tc period shown in FIG. 13. The Tb+Tc period is approximately several frames' worth of time. The received identification packets indicate the YCbCr format in the Tb period, and indicate the RGB format in the Tc period. As a result, the receiving device 2 interprets and displays the YCbCr mute signal in the YCbCr format in the period Tb, and thus black is displayed. Furthermore, the receiving device 2 interprets and displays the YCbCr mute signal in the RGB format in the period Tc, and thus deep purple is displayed.

At such a time, when color format conversion is performed, a mute image, in which black changes to deep green, is displayed, which makes it possible to reduce color scrambling. As a result, it is possible to avoid a sense of discomfort and worries of malfunction on the part of the user.

FIG. 13 shows the case where a YCbCr signal is switched to an RGB signal, but FIG. 13 is the same when switching from an RGB signal to a YCbCr signal. An RGB mute signal is outputted in the case of the latter.

It should be noted that while the above embodiment describes mute video signals when converting between color formats that express colors with different methods, it is not necessary to simultaneously mute the audio signal as well. In addition, muting may also be performed when switching between input video signals that have the same color format (for example, when the user changes channels and so on). In such a case, an arbitrary image may be used as the mute image as long as the color formats are the same.

Furthermore, the configuration may be such that the mute signal generation unit 105 is provided within the video input unit 101. Note that output of the mute signal may be selected within a predetermined range, as shown in FIG. 14.

Note that the timing at which the identification information packets are switched in the above S3 and the timing at which the color format is switched in the above S4 may be opposite. In other words, the same effect can be obtained even in the case where the identification information packet switch in the above S3 occurs after the color format switch in S4.

Second Embodiment

In the first embodiment, descriptions were given focusing upon the case where a mute image changes from black to a deep purple in the mute interval. In the present second embodiment, a video output apparatus which further reduces the change in the mute image shall be described. To achieve this, the video output apparatus of the present embodiment temporarily stops the output of identification information packets during the mute interval. The receiving device handles the video signal as being in a default format (generally speaking, RGB) during the period in which the identification information packets are being stopped. Through this, switching the format in which the video signal is interpreted to be in is performed in the receiving device at an early point in time, and thus color change in the mute image can be reduced even further.

Figure 15:
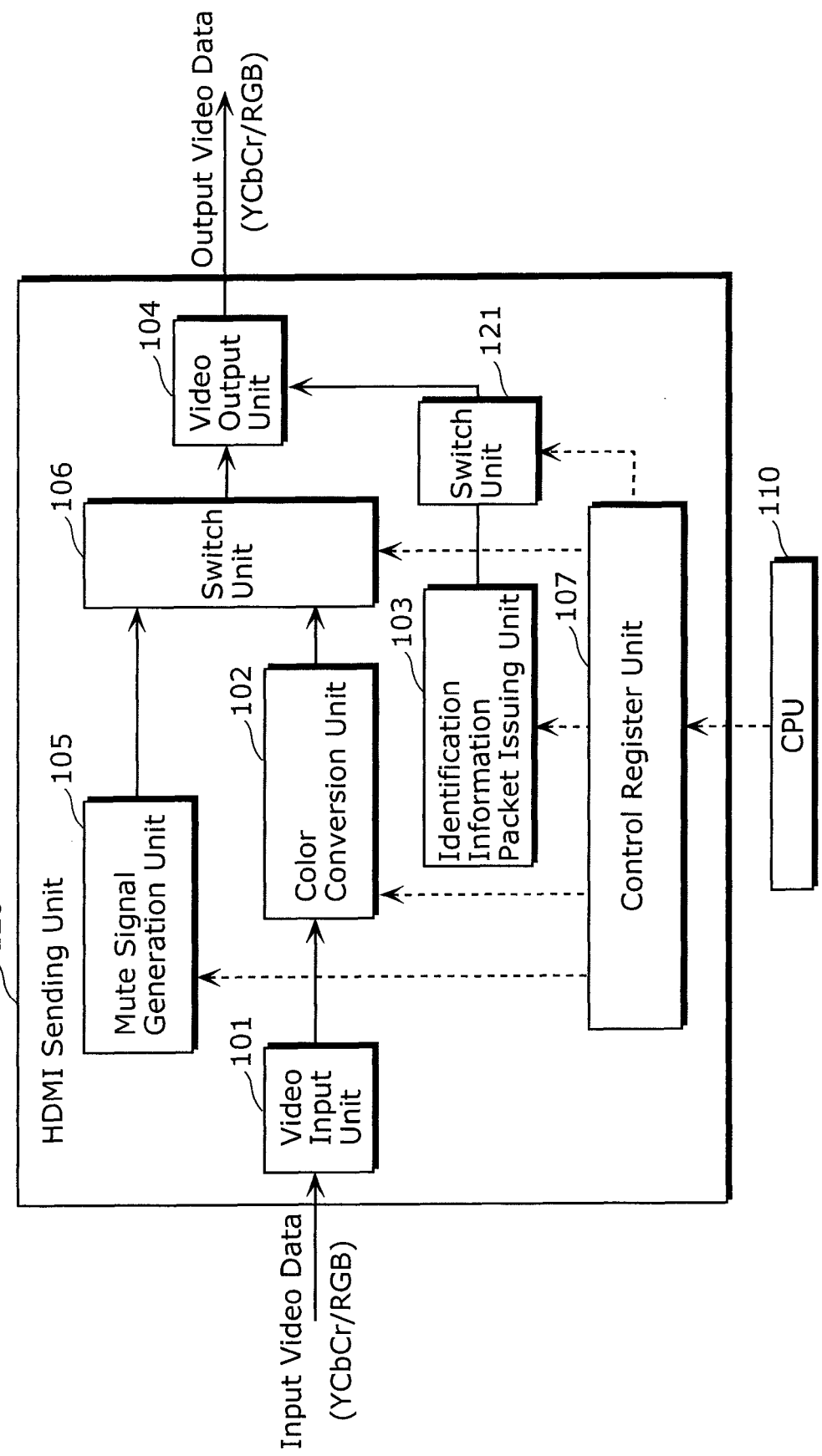
FIG. 15 is a diagram showing an outline of a system that exchanges signals via HDMI according to a second embodiment of the present invention.

FIG. 15 is a block diagram showing a configuration of the HDMI sending unit 120 according to the present embodiment. The HDMI sending unit 120 is provided in place of the HDMI sending unit 100 in the sending unit 1 shown in FIG. 7, and differs from the HDMI sending unit 100 shown in FIG. 8 in that a switch unit 121 is included. Constituent elements identical to those shown in FIG. 8 are given the same reference numbers as those in FIG. 8, and descriptions thereof shall be omitted; the descriptions provided hereafter focus on the differing points.

The register 401 of the control register unit 107 holds commands from the CPU 110, and outputs control signals corresponding to the commands for controlling selection of the switch unit 121.

The switch unit 121 selects whether or not information from the identification information packet issuing unit 103 is to be outputted to the video output unit 104. Specifically, the switch unit 121 selects whether or not to output the identification information packets during the period including the color format switch performed by the color conversion unit 102, in accordance with a value set in the control register unit 107.

Figure 16:
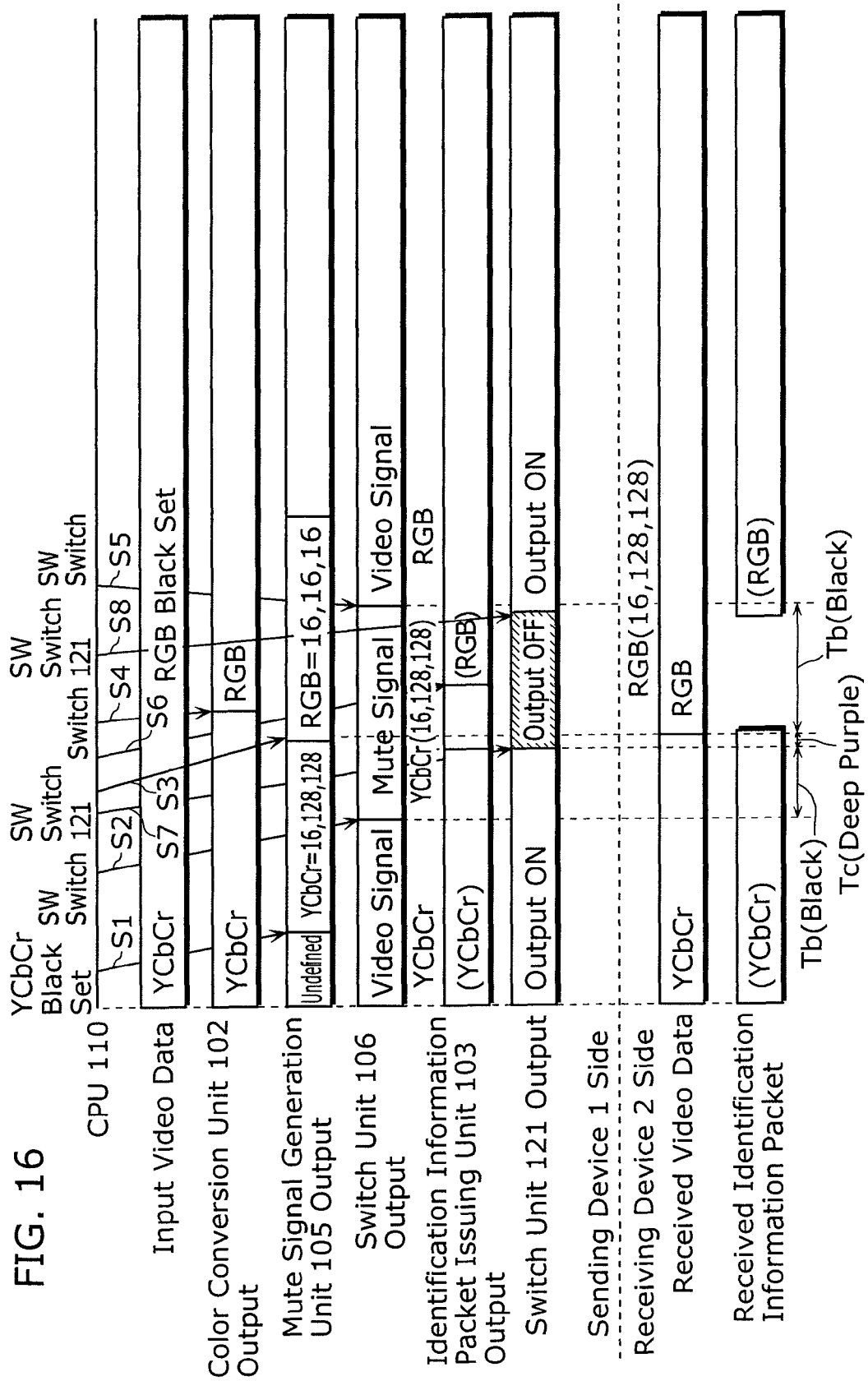
FIG. 16 is a diagram showing a control sequence for switching color formats.

FIG. 16 is a diagram showing a control sequence for switching the color format performed in the HDMI sending unit 120. FIG. 16 shows a control sequence executed in the case of switching from a YCbCr signal to an RGB signal. The horizontal axis indicates time. FIG. 16 shows the following items, in order from the top down: commands outputted by the CPU 110 to the HDMI sending unit 120; inputted video data inputted to the color conversion unit 102; video data outputted by the color conversion unit 102; a mute signal outputted by the mute signal generation unit 105; a video signal/mute signal selected and outputted by the switch unit 106; identification information packets issued by the identification information packet issuing unit 103, which are selected by the switch unit 121 and outputted; received video data received by the receiving device 2; and received identification information packets.

Upon detecting a remote-control operation that indicates the color format is to be switched, the CPU 110 first sets, in the control register unit 107, a command for the mute signal generation unit 105 to generate a YCbCr mute signal. In other words, the CPU 110 sets the first, second, and third component values in the registers 402 to 404 respectively, and furthermore sets, in the register 401, a control command which causes the selector 304 to select either the second signal generation unit 302 or the third signal generation unit 303.

Next, the CPU 110 sets, in the register 401, a command so that the switch unit 106 switches from outputting from the color conversion unit 102 to selection of the mute signal from the mute signal generation unit 105 (S2). Through this, a YCbCr mute signal is outputted from the video output unit 104.

Furthermore, the CPU 110 sets, in the register 401, a switching command so that the switch unit 121 stops the identification information packets (S7). Through this, the identification information packets are stopped from being outputted from the video output unit 104.

Furthermore, the CPU 110 sets, in the control register 107, a command indicating that the mute signal generation unit 105 is to generate an RGB mute signal (S3), and moreover sets, in the register 401, a switch command indicating that the identification information packet issuing unit 103 is to switch from identification information packets that indicate a YCbCr signal to identification information packets that indicate an RGB signal (S6). This is performed as preparation for the next color format conversion.

Furthermore, a switch command instructing the color conversion unit 102 to convert the YCbCr signal to an RGB signal is set in the register 401 (S4).

Furthermore, the CPU 110 sets, in the register 401, a switching command so that the switch unit 121 outputs the identification information packets (S8). Through this, the identification information packets are outputted from the video output unit 104.

The timing at which the identification information packets are switched in the above S7 and S8 and the timing at which the color format is switched through the mute signal in the above S3 may be different; therefore, there is less processing load on the CPU 110 when performing the switch, and thus the processing power of the CPU 110 may be low.

Also, the CPU 110 sets, in the register 401, a command so that the switch unit 106 switches from the mute signal from the mute signal generation unit 105 to selection of the video signal output of the color conversion unit 102 (S5). Accordingly, the video output unit 104 stops outputting a YCbCr mute signal and outputs a color format-converted RGB video signal.

The receiving device 2 receives a YCbCr mute signal during the periods Tb+Tc shown in the diagram, and receives an RGB mute signal during the period Td. Therefore, the received identification information packets indicate the YCbCr format during the period Tb, and indicate the RGB format during the periods Tc and Td.

As a result, the receiving device 2 interprets and displays the YCbCr mute signal in the YCbCr format in the period Tb, and thus black is displayed. Furthermore, the receiving device 2 interprets and displays the YCbCr mute signal in the RGB format in the period Tc, and thus deep purple is displayed. Further still, the receiving device 2 interprets and displays the RGB mute signal in the RGB format during the period Td, and thus black is displayed.

At such a time, when color format conversion is performed, a mute image, in which black changes to deep purple, is displayed, which makes it possible to reduce color scrambling. As a result, it is possible to avoid a sense of discomfort and worries of malfunction on the part of the user.

FIG. 16 shows the case where a YCbCr signal is switched to an RGB signal, but FIG. 16 is the same when switching from an RGB signal to a YCbCr signal. An RGB mute signal is outputted in the case of the latter.

Furthermore, the configuration may be such that the switch unit 121 is provided within the identification information packet issuing unit 103.

Note that the timing at which the identification information packets are switched in the above S6 shown in FIG. 16 and the timing at which the color format is switched in the above S4 may be opposite. In other words, the same effect can be obtained even in the case where the identification information packet switch in the above S6 occurs after the color format switch in S4.

Third Embodiment

In the first embodiment, descriptions were given central to the case where a mute image changes from black to a deep purple in the mute interval. In the present third embodiment, a video output apparatus which can eliminate change in the mute image shall be described. To achieve this, the video output apparatus of the present embodiment temporarily stops the output of the specialized video signal during the mute interval. During the period in which the video signal is stopped, the receiving device displays an image it has generated internally. This image differs depending on the receiving device, but in general is an image displayed through the video signal immediately before muting, such as a black image, a blue image (known as a "blue screen"), or the like. Through this, switching the displayed image is performed in the receiving device at an early point in time, and thus change in the mute image can be eliminated depending on the receiving device. Alternatively, in the same manner as the second embodiment, switching the format in which the video signal is interpreted to be in can be performed in the receiving device at an early point in time, and thus color change in the mute image can be reduced even further.

Figure 17:
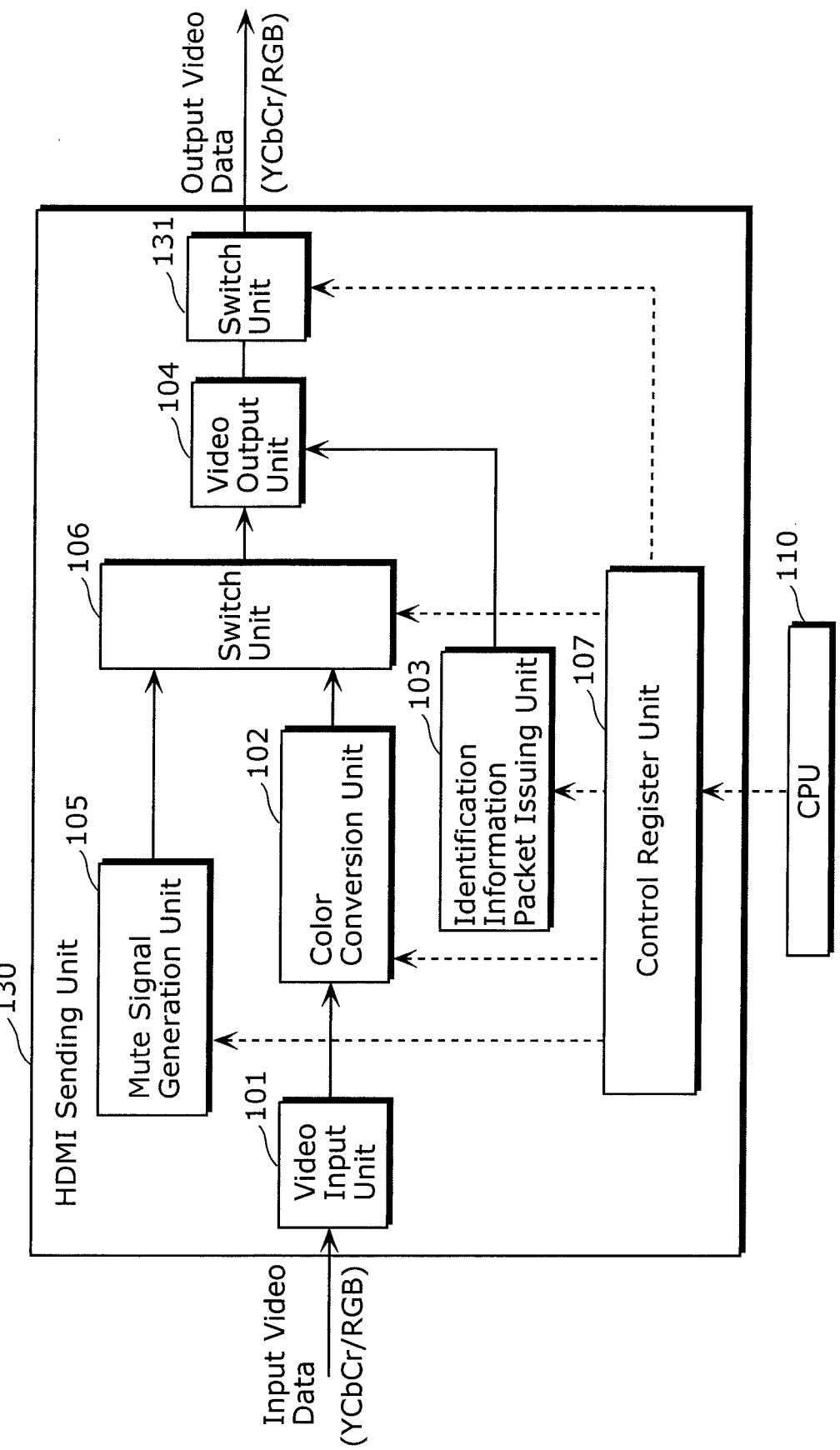
FIG. 17 is a diagram showing an outline of a system that exchanges signals via HDMI according to a third embodiment of the present invention.

FIG. 17 is a block diagram showing a configuration of the HDMI sending unit 130 according to the present embodiment. The HDMI sending unit 130 is provided in place of the HDMI sending unit 100 in the sending unit 1 shown in FIG. 7, and differs from the HDMI sending unit 100 shown in FIG. 8 in that a switch unit 131 is included. Constituent elements identical to those shown in FIG. 8 are given the same reference numbers as those in FIG. 8, and descriptions thereof shall be omitted; the descriptions provided hereafter focus on the differing points.

The register 401 of the control register unit 107 holds commands from the CPU 110, and outputs control signals corresponding to the commands for controlling selection of the switch unit 131.

The switch unit 131 selects whether or not the output video data is to be outputted from the video output unit 104. Specifically, the switch unit 131 selects whether or not to output the output video data to the receiving device 2 that is connected to the HDMI cable during the period including the color format switch performed by the color conversion unit 102, in accordance with a value set in the control register unit 107.

Figure 18:
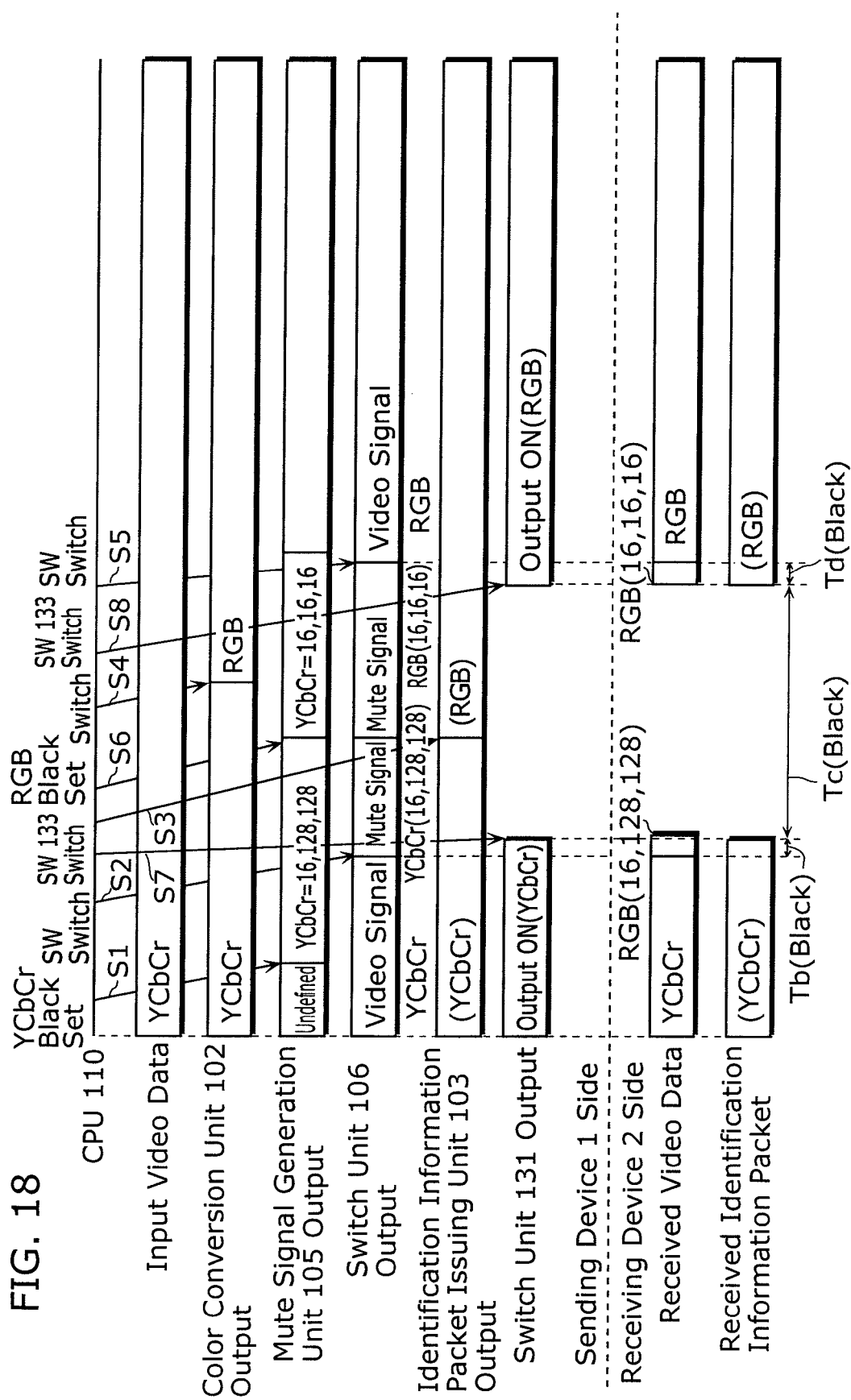
FIG. 18 is a diagram showing a control sequence for switching color formats.

FIG. 18 is a diagram showing a control sequence for switching the color format performed in the HDMI sending unit 130. This diagram shows a control sequence executed in the case of switching from a YCbCr signal to an RGB signal. The horizontal axis indicates time. FIG. 16 shows the following items, in order from the top down: commands outputted by the CPU 110 to the HDMI sending unit 120; inputted video data inputted to the color conversion unit 102; video data outputted by the color conversion unit 102; a mute signal outputted by the mute signal generation unit 105; a video signal/mute signal selected and outputted by the switch unit 106; identification information packets issued by the identification information packet issuing unit 103; the video output signal selected by the switch unit 131 and outputted; received video data received by the receiving device 2; and received identification information packets.

Upon detecting a remote-control operation that indicates the color format is to be switched, the CPU 110 first sets, in the control register unit 107, a command for the mute signal generation unit 105 to generate a YCbCr mute signal (S1). In other words, the CPU 110 sets the first, second, and third component values in the registers 402 to 404 respectively, and furthermore sets, in the register 401, a control command which causes the selector 304 to select either the second signal generation unit 302 or the third signal generation unit 303.

Next, the CPU 110 sets, in the register 401, a command so that the switch unit 106 switches from outputting from the color conversion unit 102 to selection of the mute signal from the mute signal generation unit 105 (S2). Through this, a YCbCr mute signal is outputted from the video output unit 104.

Furthermore, the CPU 110 sets, in the register 401, a switching command so that the switch unit 131 stops the output video signal (S7). Through this, the output video signal is stopped from being outputted from the video output unit 104.

Furthermore, the CPU 110 sets, in the register 401, a command indicating that the identification information packet issuing unit 103 is to switch form identification information packets indicating a YCbCr signal to identification information packets indicating an RGB signal (S3), and moreover sets, in the control register 107, a command indicating that the mute signal generation unit 105 is to generate an RGB mute signal (S6). This is performed as preparation for the next color format conversion.

Furthermore, a switch command instructing the color conversion unit 102 to convert the YCbCr signal to an RGB signal is set in the register 401 (S4).

Furthermore, the CPU 110 sets, in the register 401, a switching command so that the switch unit 131 outputs the output video signal (S8). Through this, the output video signal is outputted from the video output unit 104.

The timing at which the identification information packets are switched in the above S7 and S8 and the timing at which the color format is switched through the mute signal in the above S3 may be different; therefore, there is less processing load on the CPU 110 when performing the switch, and thus the processing power of the CPU 110 may be low.

Also, the CPU 110 sets, in the register 401, a command so that the switch unit 106 switches from the mute signal from the mute signal generation unit 105 to selection of the video signal output of the color conversion unit 102 (S5). Accordingly, the video output unit 104 stops outputting a YCbCr mute signal and outputs a color format-converted RGB video signal.

The receiving device 2 receives a YCbCr mute signal during the period Tb shown in the diagram, and receives an RGB mute signal during the period Td. Therefore, the received identification information packets indicate the YCbCr format during the period Tb, and indicate the RGB format during the period Td.

The period Tb requires several frames. The period Tc indicates a period in which nothing is received.

As a result, the receiving device 2 interprets and displays the YCbCr mute signal in the YCbCr format in the period Tb, and thus black is displayed. Furthermore, during the period Tc, neither a video signal nor identification information packets are received, and thus the receiving device displays black.

Further still, the receiving device 2 interprets and displays the RGB mute signal in the RGB format during the period Td, and thus black is displayed.

At such a time, when color format conversion is performed, a mute image, in which black changes to black once again, is displayed, which makes it possible to reduce color scrambling. As a result, it is possible to avoid a sense of discomfort and worries of malfunction on the part of the user.

FIG. 18 shows the case where a YCbCr signal is switched to an RGB signal, but FIG. 18 is the same when switching from an RGB signal to a YCbCr signal. An RGB mute signal is outputted in the case of the latter.

Furthermore, the configuration may be such that the switch unit 131 is provided within the video output unit 104.

Figure 19:
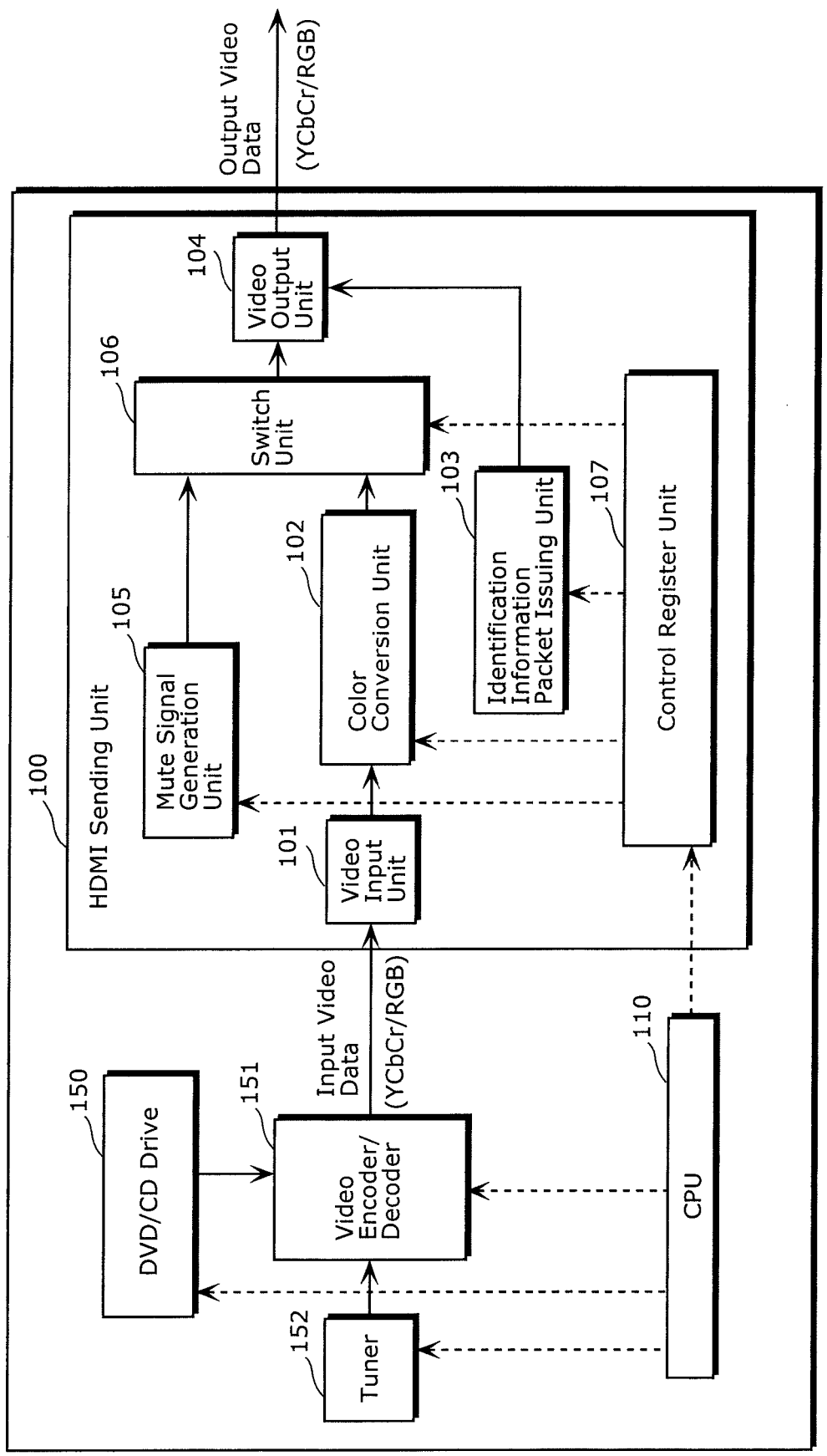
FIG. 19 is a schematic showing a case where a system according to the present invention is installed in a device.

FIG. 19 is an example of a device that includes the video output apparatus of the present invention. This device includes a tuner unit (152) as an input from the exterior, and a DVD/CD recording and reproduction unit (150); furthermore, a video encoder/decoder unit (151), which encodes/decodes an inputted video signal and outputs the video signal to the video output apparatus of the present invention, is provided.

Note that while each of the above embodiments describes a video output apparatus which outputs a video signal while switching between two color formats, or YCbCr and RGB, the color formats are not limited thereto. For example, an xvYCC (Extended YCC Colorimetry for Video Applications, IEC Standard 61966-2-4) signal and an RGB signal may be employed as the two color formats.

Furthermore, the timing at which the identification information packets are switched in the above S3 and the timing at which the color format is switched in the above S4, shown in FIG. 18, may be opposite. In other words, the same effect can be obtained even in the case where the identification information packet switch in the above S3 occurs after the color format switch in S4.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The present invention is useful in a sending device which sends a video signal to a receiving device such as a television receiving device, and is specifically applicable in DVD players, DVD recorders, Set Top Boxes (STBs) which receive digital broadcasts, digital broadcast tuner cards, and the like.

What is claimed is:

1. A video output apparatus, comprising:
   a video outputter operable to output a video signal while switching a format of the video signal between a first format and a second format for expressing color differently;
   a mute signal generator operable to generate, as a muting video signal, a specialized video signal expressing a color in which a difference between a color displayed when the specialized video signal is interpreted in its own format and a color displayed when the specialized video signal is interpreted in a different format is within a predetermined limited permissible range of an entire range of color difference; and
   a selector operable to select one of the video signal outputted by said video outputter and the muting video signal generated by said mute signal generator, and output a selected signal,
   wherein in a case where said video outputter switches the video signal from the first format to the second format, said mute signal generator is operable to generate the specialized video signal of the first format during a period including the format switch;
   in a case where said video outputter switches the video signal from the second format to the first format, said mute signal generator is operable to generate the specialized video signal of the second format during a period including the format switch; and
   the specialized video signal of the first format and the specialized video signal of the second format are substantially a same color.

2. The video output apparatus according to claim 1,
   wherein said video outputter is operable to switch the video signal from the first format to the second format;
   the specialized video signal is generated in the first format;
   the first format is expressed by a 24-bit RGB signal having red, blue, and green color components; and
   a difference between a color displayed when the specialized video signal of the first format is interpreted in the first format and a color displayed when the specialized video signal of the first format is interpreted in the second format is within a predetermined limited permissible range of an entire range of color difference, the second format being a 24-bit format having a luminance component and two chroma components.

3. The video output apparatus according to claim 1,
   wherein said video outputter is operable to switch the video signal from the second format to the first format;
   the specialized video signal is generated in the second format;
   the second format is expressed by a 24-bit YCbCr signal having a luminance component and two chroma components; and
   a color outputted is a color in which a difference between a color displayed when the specialized video signal of the second format is interpreted in the second format and a color displayed when the specialized video signal of the second format is interpreted in the first format is within a predetermined limited permissible range of an entire range of color difference, the first format being a 24-bit RGB format having red, green, and blue color components.

4. A video output apparatus, comprising:
   a video outputter operable to output a video signal while switching the format of the video signal between a first format and a second format for expressing color differently;
   a mute signal generator operable to generate, as a muting video signal, a specialized video signal expressing a color in which a difference between a color displayed when the specialized video signal is interpreted in its own format and a color displayed when the specialized video signal is interpreted in a different format is within a predetermined limited permissible range of an entire range of color difference;
   a video selector operable to select one of the video signal outputted by said video outputter and the muting video signal generated by said mute signal generator, and output a selected signal;

an identification generator operable to generate identification information indicating one of the first format and the second format; and an identification outputter operable to multiplex the identification information with the video signal outputted from said video selector, and output the multiplexed video signal to an exterior, wherein said mute signal generator includes:

an RGB signal generator operable to generate the specialized video signal of the first format, the first format indicating a 24-bit RGB signal having red, blue, and green color components;

a YCbCr signal generator operable to generate the specialized video signal of the second format, the second format indicating a 24-bit format having a luminance component and two chroma components; and a specialized selector operable to select one of the specialized video signal of the first format generated by said RGB signal generator and the specialized video signal of the second format generated by said YCbCr signal generator, wherein a controller performs the following in order:

causing said specialized selector to select the specialized video signal of the first format;

controlling said video selector to switch from selection of the video signal outputted by said video outputter to selection of the muting video signal outputted by said video selector;

instructing said video outputter to switch the format of the video signal from the first format to the second format;

controlling said identification generator to generate the identification information in accordance with the format switch at a timing in a period including the format switch different from a timing of the format switch; and controlling said video selector to switch from selection of the muting video signal outputted from said video selector to selection of the video signal outputted from said video outputter.

5. A video output apparatus, comprising:

a video outputter operable to output a video signal while switching a format of the video signal between a first format and a second format for expressing color differently;

a mute signal generator operable to generate, as a muting video signal, a specialized video signal expressing a color in which a difference between a color displayed when the specialized video signal is interpreted in its own format and a color displayed when the specialized video signal is interpreted in a different format is within a predetermined limited permissible range of an entire range of color difference; and a video selector operable to select one of the video signal outputted by said video outputter and the muting video signal generated by said mute signal generator, and output a selected signal, wherein said mute signal generator includes:

an RGB signal generator operable to generate the specialized video signal of the first format, the first format indicating (R, G, B);

a YCbCr signal generator operable to generate the specialized video signal of the second format, the second format indicating (Y, Cb, Cr); and a specialized selector operable to select one of the specialized video signal of the first format generated by said RGB signal generator and the specialized video signal of the second format generated by said YCbCr signal generator, and a controller that performs the following in order:

causing said specialized selector to select the specialized video signal of the first format;

controlling said video selector to switch from selection of the video signal outputted by said video outputter to selection of the muting video signal outputted by said video selector;

instructing said video outputter to switch the format of the video signal from the first format to the second format; and controlling said video selector to switch from selection of the muting video signal outputted from said selector to selection of the video signal outputted from said video outputter.

6. A video output apparatus, comprising:

a video outputter operable to output a video signal while switching a format of the video signal between a first format and a second format for expressing color differently;

a mute signal generator operable to generate, as a muting video signal, a specialized video signal expressing a color in which a difference between a color displayed when the specialized video signal is interpreted in its own format and a color displayed when the specialized video signal is interpreted in a different format is within a predetermined limited permissible range of an entire range of color difference; and a selector operable to select one of the video signal outputted by said video outputter and the muting video signal generated by said mute signal generator, and output a selected signal, wherein the first format is expressed by a 24-bit RGB signal having red, blue, and green color components, and component values of the specialized video signal of the first format are (16, 16, 16); and the second format is expressed by a 24-bit YCbCr signal having a luminance component and two chroma components, and component values of the specialized video signal of the second format are (16, 128, 128).

7. A video output apparatus, comprising:

a video outputter operable to output a video signal while switching a format of the video signal between a first format and a second format for expressing color differently;

a mute signal generator operable to generate, as a muting video signal, a specialized video signal expressing a color in which a difference between a color displayed when the specialized video signal is interpreted in its own format and a color displayed when the specialized video signal is interpreted in a different format is within a predetermined limited permissible range of an entire range of color difference; and a selector operable to select one of the video signal outputted by said video outputter and the muting video signal generated by said mute signal generator, and output a selected signal, wherein the first format is expressed by a 30-, 36-, or 48-bit RGB signal having red, blue, and green color components, and component values of the specialized video signal of the first format are (64, 64, 64) for a 30-bit signal, (256, 256, 256) for a 36-bit signal, and (4096, 4096, 4096) for a 48-bit signal; and the second format is expressed by a 30-, 36-, or 48-bit YCbCr signal having a luminance component and two chroma components, and component values of the specialized video signal of the second format are (64, 512, 512) for a 30-bit signal, (256, 2048, 2048) for a 36-bit signal, and (4096, 32768, 32768) for a 48-bit signal.

8. A video output apparatus, comprising:
a video outputter operable to switch a format of a video signal between a first format and a second format for expressing color, and output the video signal;
a mute signal generator operable to generate, as a muting video signal, a specialized video signal expressing a color in which a visual difference between a color displayed when the specialized video signal is interpreted in its own format and a color displayed when the specialized video signal is interpreted in a different format is within a predetermined limited range of an entire range of visual difference; and
a selector operable to select one of the video signal outputted from said video outputter and the muting video signal generated by said mute signal generator, and output a selected signal, wherein the first format is expressed by a 30-, 36-, or 48-bit RGB signal having red, blue, and green color components, and component values of the specialized video signal of the first format are (64, 64, 64) for a 30-bit signal, (256, 256, 256) for a 36-bit signal, and (4096, 4096, 4096) for a 48-bit signal; and the second format is expressed by a 30-, 36-, or 48-bit YCbCr signal having a luminance component and two chroma components, and component values of the specialized video signal of the second format are (64, 512, 512) for a 30-bit signal, (256, 2048, 2048) for a 36-bit signal, and (4096, 32768, 32768) for a 48-bit signal.

* * * * *

UNITED STATES PATENT AND TRADEMARK OFFICE
CERTIFICATE OF CORRECTION

PATENT NO. : 8,040,433 B2
APPLICATION NO. : 11/678889
DATED : October 18, 2011
INVENTOR(S) : Takayuki Matsui et al.

It is certified that error appears in the above-identified patent and that said Letters Patent is hereby corrected as shown below:

Column 18, line 24 (claim 2), "a" before the term difference should read -the-, and "a" before the term color should read -the-.

Column 18, line 26 (claim 2), "a" before the term color should read -the-.

Column 18, line 40 (claim 3), "a" before the term color should read -the-, "a" before the term difference should read -the-, and "a" after the term between should read -the-.

Column 18, line 42 (claim 3), "a" after the term and should read -the-.

Column 18, line 51 (claim 4), "the" after the term switching should read -a-.

Signed and Sealed this
Fifteenth Day of May, 2012

David J. Kappos
*Director of the United States Patent and Trademark Office*